R. STOCK.
PLOWSHARE.
APPLICATION FILED OCT. 31, 1911.
1,058,486.
Patented Apr. 8, 1913.
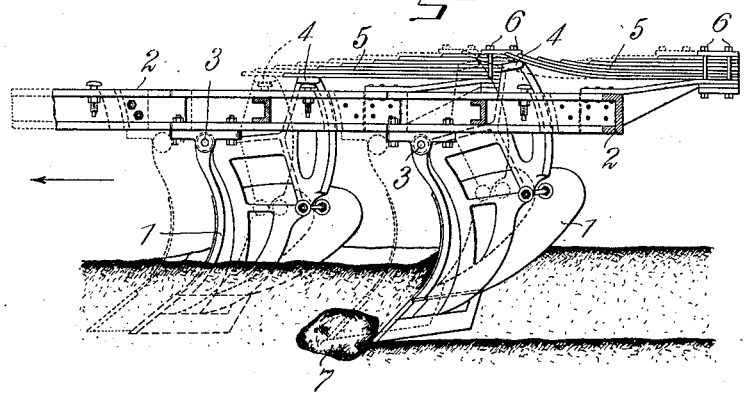
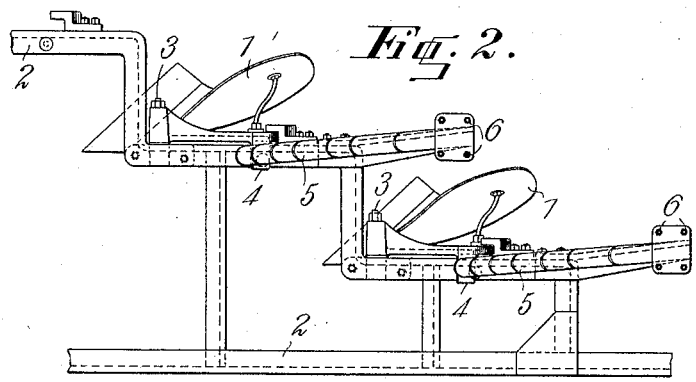
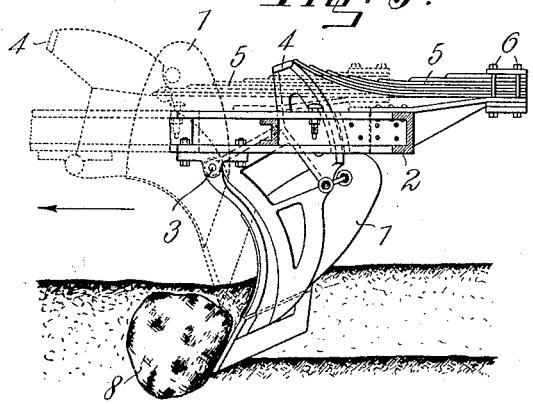
Witnesses:
Harriette C. Thirkield
Charles Mathe
Inventor
Robert Stock
by John Lotka
Attorney

UNITED STATES PATENT OFFICE.

ROBERT STOCK, OF BERLIN, GERMANY.

PLOWSHARE.

1,058,486. Specification of Letters Patent. Patented Apr. 8, 1913.

Application filed October 31, 1911. Serial No. 657,857.

*To all whom it may concern:*

Be it known that I, ROBERT STOCK, a subject of the German Emperor, and a resident of Berlin, Germany, have invented certain new and useful Improvements in Plowshares, of which the following is a specification.

My invention relates to plowshares, particularly for motor plows and has for its object so to connect the share with the frame of the plow as to prevent injury to the share in the event of its striking stones or other obstacles.

In connection with horse-drawn plows it has been proposed to provide the shares with spring-pressed pivoted carriers, so as to enable the shares to yield upwardly when coming in contact with obstacles such as stones, etc., the power of the spring returning each share automatically to its normal working position after the obstacle has been cleared. This expedient has proved inadequate in the case of motor plows, because with these the tractive power is so great that upon the share's meeting an obstacle such as a stone frozen fast in the soil, the arising resistance will be so considerable that it cannot be taken up by the spring bearing on the share.

According to my present invention, an improved action is obtained by so constructing the plow that the share will be relieved entirely from the pressure of its spring or other returning device, in case the obstacle met produces a resistance greater than the spring can balance, while less powerful obstacles will be overcome in the usual way by a yielding of the share or a pushing aside of the obstacle, the spring in this case restoring the share automatically to its working position.

An example of my invention is illustrated in the accompanying drawings, in which—

Figure 1 is a side elevation, with parts in section, showing a portion of a plow-frame with two shares mounted according to my invention; Fig. 2 is a corresponding plan view; and Fig. 3 is a side elevation of one of the plowshares and adjacent parts, showing different positions of the share.

In the particular embodiment of my invention represented in the drawings, the plowshares 1 are pivotally supported on the frame 2 by means of bolts 3, and each share is provided on its rear side with a lateral arm 4 normally engaged from above by the free end of a leaf spring 5 constituting a yielding device tending to return the share to its working position. This spring as shown may be a graduated leaf spring fastened at its other end to the frame 2, as by bolts 6. The particular plow-frame illustrated has a step-like arrangement, as shown in Fig. 2, but this feature forms no part of my present invention. The strength of the spring 5 should be such that the share 1, on account of its pivoted and spring-pressed character, can yield more or less when it strikes an obstacle opposing a relatively slight resistance, such as the stone 7 (Fig. 1). At the same time, this obstacle would be pushed aside more or less according to the greater or smaller looseness of the soil. The dotted lines at the right-hand portion of Fig. 1 indicate this slightly raised position of the plowshare 1. Of course, as soon as the share clears the obstruction 7, the spring 5 will restore the share 1 automatically to its original working position. Supposing however that the share 1 strikes against a stone or other body 8 (Fig. 3) which opposes to the progress of the share, a resistance greater than the maximum pressure of the spring 5, the lateral arm 4 of the share 1 will force the free end of the spring 5 back (upward) until the body of the share is released entirely from the spring and passes automatically into the inoperative or idle position, as indicated by dotted lines in Fig. 3, the arm 4 then being out of contact with the spring 5. The share will remain in this idle position until the operator using any suitable tool to lift the free end of the spring 5 forces the share back to its operative position in which the arm 4 is under the free end of the spring 5. It will be seen that the yielding device constituted by the spring 5 has a variable engagement with the plowshare, being at times in operative engagement therewith, and releasing the share under certain conditions.

An important feature of my invention is the arrangement of the arm or projection 4 and of the spring 5 engaging it, laterally of the share 1. The share is thus enabled to swing upward to a considerable extent, the dotted lines in Fig. 3 showing a portion of the share above the level of the spring 5; a movement of this extent would of course be impossible if the spring 5 were in the path of the share 1 itself.

The above-described arrangement of pivoted spring-pressed plowshares is of especial advantage when applied to motor plows, since on the one hand it will prevent the shares from being injured or broken even when meeting very powerful obstructions, and on the other hand the jars and vibrations to which the plow-frame is subjected when the shares strike against obstacles, will be avoided or at least relieved in a large measure, thus preserving the efficiency of the engine, which would be impaired by heavy jars and vibrations of the plow-frame.

Various modifications may be made without departing from the nature of my invention as defined in the appended claims.

I claim:

1. In a plow, a frame, a share pivoted thereto and provided on its rear side with a lateral arm, and a spring arranged laterally of the path of said share the free end of said spring being adapted to engage said arm in the operative position of the share, the other end of said spring being secured to the frame.

2. In a plow, a frame, a share pivoted thereto and provided on its rear side with a lateral arm, and a graduated leaf spring arranged laterally of the path of said share the free end of said spring being adapted to engage said arm in the operative position of the share, the other end of said spring being secured to the frame.

3. In a plow, a frame, a share mounted thereon movably and provided with a lateral projection, and a yielding device arranged laterally of the path of the share and normally in engagement with said projection to return the share to its operative position, but adapted to become disengaged from said projection and to allow the share to take an inoperative position when it strikes an obstruction sufficient to overcome the power of said device.

In testimony whereof I have signed this specification in the presence of two subscribing witnesses.

ROBERT STOCK.

Witnesses:
WOLDEMAR HAUPT,
HENRY HASPER.

---

Copies of this patent may be obtained for five cents each, by addressing the "Commissioner of Patents, Washington, D. C."